(12) United States Patent
Narahara et al.

(10) Patent No.: US 11,787,474 B2
(45) Date of Patent: Oct. 17, 2023

(54) VEHICLE SUSPENSION TOWER STRUCTURE

(71) Applicant: MAZDA MOTOR CORPORATION, Hiroshima (JP)

(72) Inventors: Takashi Narahara, Hiroshima (JP); Yusuke Desaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/738,221

(22) Filed: May 6, 2022

(65) Prior Publication Data
US 2022/0388573 A1 Dec. 8, 2022

(30) Foreign Application Priority Data

Jun. 2, 2021 (JP) .................................. 2021-092879

(51) Int. Cl.
*B62D 21/11* (2006.01)
(52) U.S. Cl.
CPC .................................. *B62D 21/11* (2013.01)
(58) Field of Classification Search
CPC .... B62D 25/08; B62D 25/082; B62D 25/085; B62D 25/088; B62D 21/11
See application file for complete search history.

(56) References Cited

U.S. PATENT DOCUMENTS

| | | | | |
|---|---|---|---|---|
| 2,997,122 A | * | 8/1961 | Frey ...................... | B62D 25/088 280/124.179 |
| 4,955,663 A | * | 9/1990 | Imura ................... | B62D 25/082 296/203.02 |
| 5,024,482 A | * | 6/1991 | Isukimi ................ | B62D 25/088 296/203.02 |
| 5,431,363 A | * | 7/1995 | Ezzat ................... | B62D 25/088 248/562 |
| 5,456,517 A | * | 10/1995 | Kalian ................. | B62D 29/008 164/47 |
| 5,826,845 A | * | 10/1998 | Lounsbury ............ | B62D 5/062 248/635 |
| 7,703,805 B2 | * | 4/2010 | Sasaki ................. | B62D 21/152 296/203.02 |

(Continued)

FOREIGN PATENT DOCUMENTS

| | | | |
|---|---|---|---|
| JP | 2004268806 A | * | 9/2004 |
| JP | 2009143405 A | * | 7/2009 |

(Continued)

*Primary Examiner* — Laura Freedman
(74) *Attorney, Agent, or Firm* — Studebaker & Brackett PC

(57) ABSTRACT

A rigid suspension tower structure includes a sus-tower for supporting a damper, and a bracket for mounting a component to be secured to the sus-tower. The sus-tower includes a curved side wall portion joined to a front side frame of a vehicle body and extending upward, and a top portion supporting the upper end of the damper. The side wall portion has a pair of mounting portions made of bulging portions. The mounting portions are formed on mutually different sides in a vehicle front-rear direction with a virtual line interposed therebetween, the line being formed by intersecting the side wall portion and a plane that extends parallel to a vehicle width direction and passes through the central axis of the damper. The bracket straddles the line and is secured to the mounting portions.

15 Claims, 10 Drawing Sheets

(56) References Cited

U.S. PATENT DOCUMENTS

| | | | | |
|---|---|---|---|---|
| 7,887,123 | B2 * | 2/2011 | Honji | B62D 25/088 |
| | | | | 296/203.02 |
| 8,727,380 | B2 * | 5/2014 | Akaki | B62D 25/088 |
| | | | | 280/124.109 |
| 8,746,784 | B2 * | 6/2014 | Hanakawa | B62D 25/088 |
| | | | | 296/193.09 |
| 9,381,950 | B2 * | 7/2016 | Kim | B62D 25/088 |
| 9,481,398 | B2 * | 11/2016 | Ohoka | B23K 11/24 |
| 9,539,872 | B2 * | 1/2017 | Kim | B62D 21/11 |
| 9,714,053 | B2 * | 7/2017 | Fukuoka | B62D 24/00 |
| 9,855,975 | B2 * | 1/2018 | Amemiya | B62D 21/00 |
| 9,878,743 | B2 * | 1/2018 | Maruyama | B62D 25/088 |
| 9,950,603 | B2 * | 4/2018 | Abe | B62D 21/15 |
| 10,071,768 | B2 * | 9/2018 | Yasuhara | B60K 6/20 |
| 10,214,242 | B2 * | 2/2019 | Maruyama | B62D 25/088 |
| 10,245,932 | B1 * | 4/2019 | Suzuki | B62D 25/08 |
| 10,464,608 | B2 * | 11/2019 | Kamei | B62D 21/03 |
| 10,486,623 | B2 * | 11/2019 | Hashino | B60R 16/0215 |
| 10,486,751 | B2 * | 11/2019 | Nakauchi | B62D 25/082 |
| 10,538,274 | B2 * | 1/2020 | Kondo | B62D 25/088 |
| 10,577,024 | B2 * | 3/2020 | Flickinger | F16F 1/3732 |
| 11,104,386 | B2 * | 8/2021 | Kondo | B62D 21/15 |
| 11,173,963 | B2 * | 11/2021 | Matsuoka | B62D 21/152 |
| 11,319,007 | B2 * | 5/2022 | Carrie | B62D 25/088 |
| 11,505,249 | B2 * | 11/2022 | Kirita | B62D 25/082 |
| 2022/0194474 | A1 * | 6/2022 | Kim | B62D 21/152 |
| 2023/0067279 | A1 * | 3/2023 | Muraoka | B60R 22/24 |

FOREIGN PATENT DOCUMENTS

| | | | | |
|---|---|---|---|---|
| JP | 2010083261 | A * | 4/2010 | |
| JP | 2010112425 | A * | 5/2010 | |
| JP | 2012106632 | A * | 6/2012 | B62D 25/082 |
| JP | 2017039347 | A * | 2/2017 | B62D 25/082 |
| JP | 2019-055686 | A | 4/2019 | |
| JP | 2019182282 | A * | 10/2019 | |

* cited by examiner

VEHICLE SUSPENSION TOWER STRUCTURE

TECHNICAL FIELD

The present disclosure relates to a vehicle suspension tower structure for supporting an input load from a damper (shock absorber) and the like.

BACKGROUND ART

A suspension tower (damper housing) for supporting an input load from a suspension apparatus constituted by a damper, a coil spring, and so on is provided in a vehicle body side portion of an automobile or the like.

As well known, the suspension tower (hereinafter referred to as the "sus-tower") is mounted adjacent to a tire housing so as to jut out into an engine room (motor room). In the engine room, a variety of wire harnesses are routed along the sus-tower, and the wire harnesses are often supported by the sus-tower. For example, Japanese Patent Laid-Open No. 2019-055686 discloses a wire harness routing structure in which a bracket is secured to a side wall portion of the sus-tower, and the wire harness is supported by the sus-tower through the bracket.

SUMMARY

In the case in which the wire harness is supported by the sus-tower through the bracket, a structure in which a bracket mounting portion is formed on the sus-tower, and the bracket is fastened to this mounting portion with a bolt and a nut is employed. Since the mounting portion is formed by curving (bulging) a portion of the sus-tower, when a load is input from the damper, stress is likely to concentrate at the mounting portion due to the structure. Such a structure hardly has a direct influence on the strength of the vehicle body, but can be a factor to decrease the rigidity of the sus-tower, and therefore it is considered that the sus-tower may be, for example, deformed if an excessive load is repetitively input from the suspension apparatus. In particular, in a vehicle in which the region under a waist line is wide and to which relatively large size (diameter) wheels are mounted, since the sus-tower tends to have long lengths both in the up-down direction and the front-rear direction, it is important to ensure the rigidity of the sus-tower from a viewpoint of preventing the deformation and the like. The same can also be said for a case in which a member other than the wire harness is supported by the sus-tower through the bracket.

In order to solve such a problem, it is considered to reinforce the sus-tower with a reinforcement member (for example, Japanese Patent Laid-Open No. 2009-35059), but this causes an increase in weight and a rise in the cost due to an increase in the number of components, and therefore is not always desirable.

The present disclosure has been made in view of such a circumstance, to provide a technique that can ensure the rigidity of a suspension tower with a reasonable configuration in a structure in which a component such as a wire harness is supported by the suspension tower through a bracket.

A vehicle suspension tower structure according to an aspect of the present disclosure includes: a suspension tower formed at a side portion in a front compartment of a vehicle body to support a damper; and a bracket for mounting a component to be secured to the suspension tower, and is characterized in that the suspension tower includes a curved side wall portion joined to a front side frame of the vehicle body and extending upward, and a top portion disposed on an upper end of the side wall portion and supporting an upper end of the damper. The side wall portion has a pair of mounting portions for the bracket, the mounting portions being made of portions bulging toward the vehicle-width-direction inner side. The pair of mounting portions are formed to have mounting faces for the bracket, and at least the mounting faces are located on mutually different sides in the vehicle front-rear direction with a line interposed therebetween. The line is formed by intersecting the side wall portion and a plane that extends parallel to the vehicle width direction and contains the central axis of the damper, and the bracket is disposed to straddle the line and is secured to the pair of mounting portions.

With this suspension tower structure, it is possible to ensure the rigidity of the suspension tower with a reasonable configuration. That is, upon input of a load from the damper, on the suspension tower, a force (load) in the up-down direction mainly acts in a region along a line (virtual line) which is formed by intersecting the side wall portion and a plane that extends parallel to the vehicle width direction and contains the central axis of the damper. In the suspension tower structure, the pair of mounting portions for the bracket are arranged such that at least mounting faces thereof are located on mutually different sides in the vehicle front-rear direction with the line interposed therebetween. In other words, each mounting portion is not present on the line, or, if present, is a portion with a small bulging amount (a portion with a small amount of change in the side wall portion). Consequently, concentration of stress at the mounting portions is reduced or avoided, and a decrease in the rigidity of the suspension tower due to the mounting portions is prevented.

Moreover, since the bracket straddles the line and is secured to the side wall portion (mounting portions) of the suspension tower, the bracket itself functions as a reinforcement member for the suspension tower, thereby reducing relative displacement of the regions on both sides of the line in the side wall portion.

Thus, in a case in which a component such as a wire harness is supported by the suspension tower through the bracket, it is possible to reasonably ensure the rigidity of the suspension tower, without additionally providing an exclusive reinforcement member.

In the suspension tower structure, it is preferred that the pair of mounting portions be offset in the up-down direction.

With this structure, the regions on both the front and rear sides with the line interposed therebetween in the side wall portion are prevented from being deformed as if twisted to each other. Thus, this is effective for ensuring the rigidity of the suspension tower.

In the suspension tower structure, it is preferred that at least a cross section along the line, and extending from an upper part of the side wall portion to the top portion be curved in shape.

With this structure, since a ridge portion is not formed in the portion from the upper part of the side wall portion to the top portion, concentration of stress at this portion is less likely to occur. Thus, this is effective for ensuring the rigidity of the suspension tower.

In the suspension tower structure, it is preferred that the bracket have a ridge extending so as to intersect a line segment connecting securing positions which are secured to the pair of mounting portions.

With this structure, the side wall portion on both the front and rear sides with the line interposed therebetween is prevented from being deformed as if twisted. Thus, this is further effective for ensuring the rigidity of the suspension tower.

In this case, the bracket includes a reference face portion along the side wall portion, a pair of securing portions formed so as to bulge from the reference face portion toward the suspension tower side, and a component attachment portion extending from the reference face portion toward an opposite side to the suspension tower, and each of the securing portions includes a securing face portion that is an inner bottom face portion and is secured to the mounting portion, and a connecting face portion connecting the reference face portion and the securing face portion, and has the ridge at each of boundary portions between the reference face portion and the connecting face portion, and between the securing face portion and the connecting face portion.

With this structure, since the securing face portion which is secured to the suspension tower (mounting portion) is offset to the suspension tower side, the bulging amount of the mounting portion can be reduced by a corresponding amount. That is, even when the suspension tower and a component to be attached to the bracket need to be separated from each other by a certain distance, it is possible to reduce the bulging amount on the mounting portion side. Therefore, concentration of stress at the mounting portion can be reduced compared to a case in which the bulging amount is large, and this structure is effective for ensuring the rigidity of the suspension tower. Moreover, since the bracket has the ridges at the boundary portions between the reference face portion and the connecting face portion, and between the securing face portion and the connecting face portion, it is also possible to have the above-described working effect of the ridges.

In this case, it is preferred that the component attachment portion be located between the pair of securing portions in the vehicle front-rear direction.

In the suspension tower structure, the bracket functions as a reinforcement member for the suspension tower (side face portion). Therefore, according to the above-described structure in which the component attachment portion is arranged between the pair of securing portions of the bracket, excellent positional stability of the component to be attached is ensured.

With the vehicle suspension tower structure of each of the above aspects, in the case in which a component such as a wire harness is supported by the suspension tower, it is possible to ensure the rigidity of the suspension tower with a reasonable configuration.

DETAILED DESCRIPTION

Hereinafter, an embodiment of the present disclosure will be described in detail with reference to the drawings.

Figure 1:
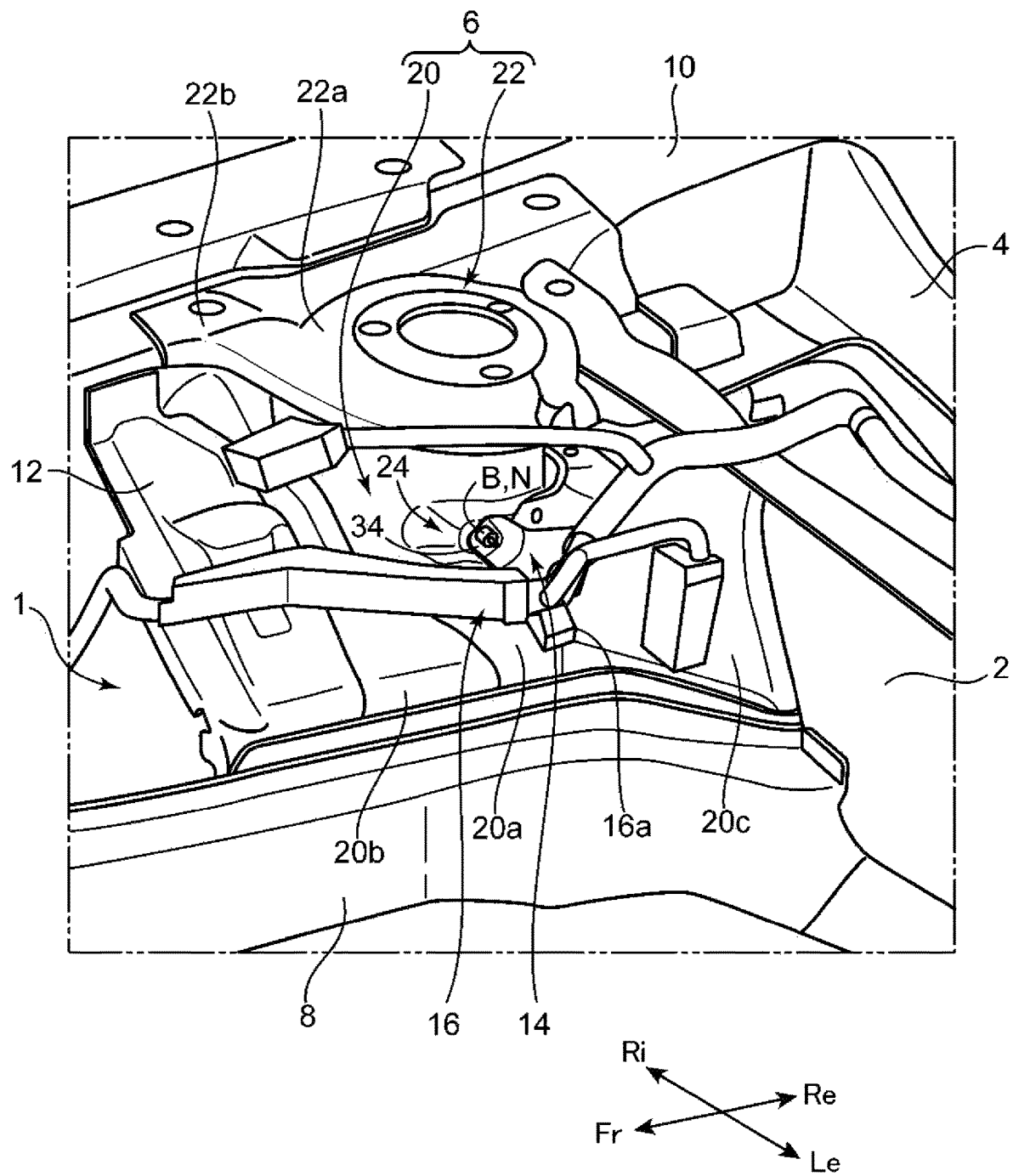
FIG. 1 is a perspective view of the inside (right-side portion) of an engine room of a vehicle.

FIG. 1 is a perspective view of an engine room 1 of a vehicle (automobile), and mainly shows a right-side portion in the engine room 1. Note that the engine room 1 is an example of a front compartment provided in the vehicle (vehicle body).

The vehicle body of the vehicle shown in FIG. 1 includes a dash panel 2 separating the engine room 1 from a vehicle cabin which is not shown in the illustration, a pair of left and right suspension towers 6 (hereinafter referred to as the sus-towers 6) provided so as to jut out into the engine room 1, and a cowl panel 4 arranged above the dash panel 2 and extending in the vehicle width direction (left-right direction). "Fr", "Re", "Le", and "Ri" in FIG. 1 represent front, rear, left, and right directions, respectively, in the vehicle body.

A rear end of each of a pair of left and right front side frames 8 is coupled to a front-face lower end of the dash panel 2. A pair of left and right wheel apron reinforcements 10 (hereinafter referred to as the apron reinforcements 10) extending in the front-rear direction are arranged in the left and right end portions, respectively, of the engine room 1 to form left and right sides walls of the engine room 1. Each of the pair of apron reinforcements 10 is connected through a connection frame 12 to some middle portion of the front side frame 8 arranged on the lower side. The front side frame 8, the apron reinforcement 10, and the connection frame 12 cooperatively support the sus-tower 6 on the vehicle body.

A wire harness 16 is arranged along the cowl panel 4, the sus-tower 6, and the connection frame 12. In a case in which the vehicle is a hybrid vehicle, the wire harness 16 includes, for example, a harness for connecting a battery and an inverter. A bracket 14 is secured to the sus-tower 6, and a portion (some middle portion) of the wire harness 16 is supported by the sus-tower 6 through the bracket 14.

Figure 2:
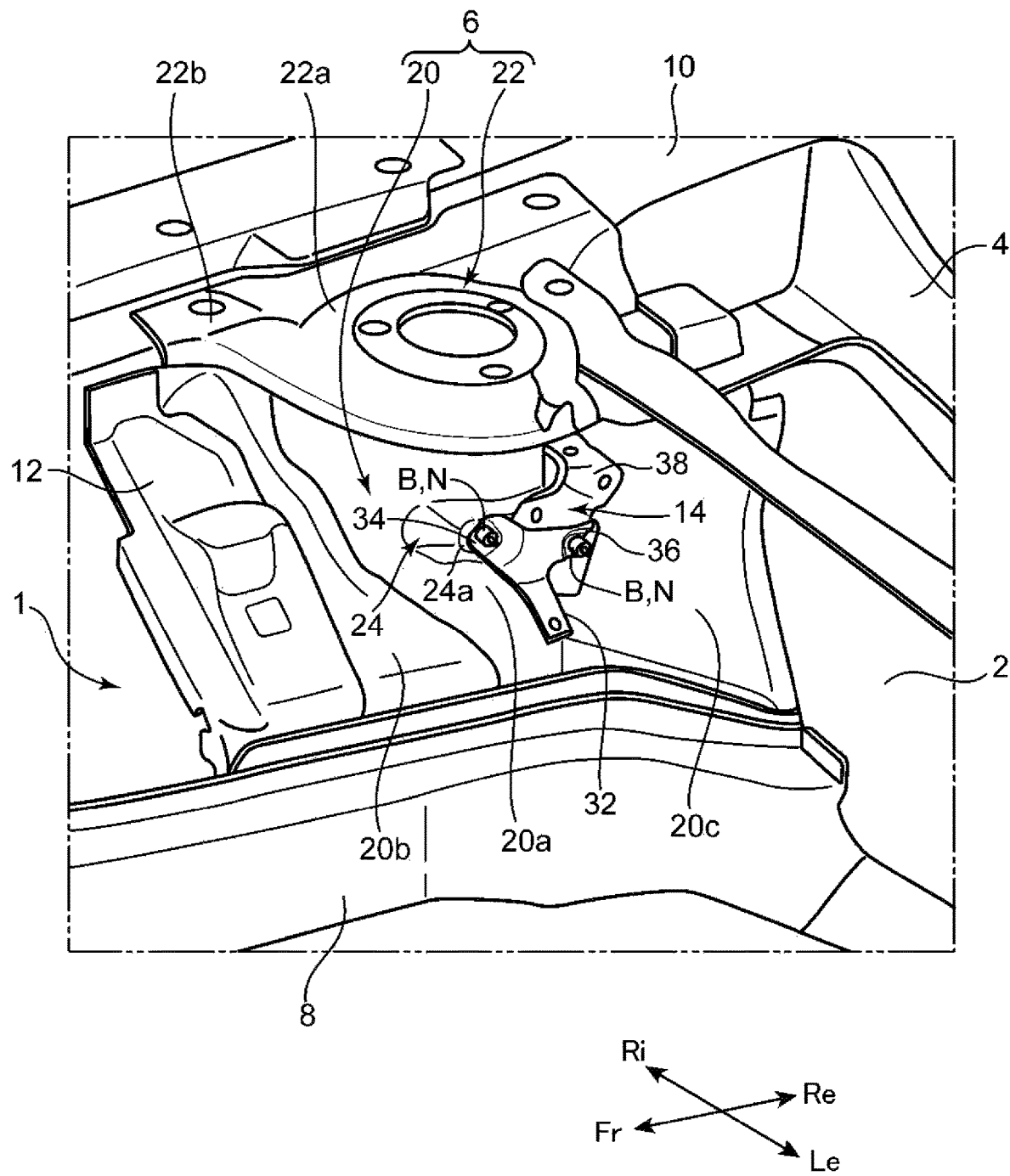
FIG. 2 is a perspective view of the inside of the engine room in a state in which a wire harness is removed.
Figure 3:
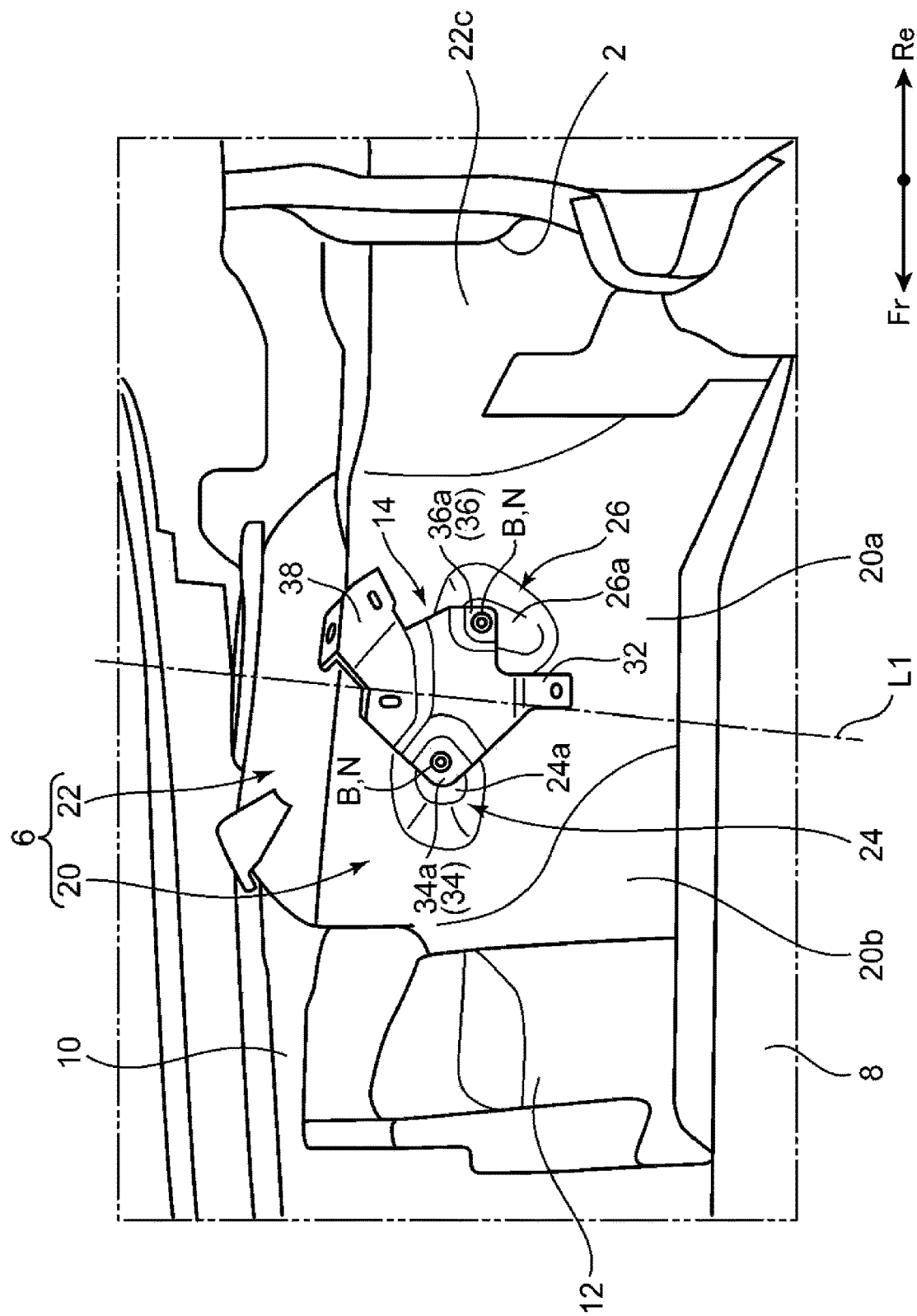
FIG. 3 is a view of a suspension tower in the engine room as seen from the left side (a state in which a bracket is attached).
Figure 4:
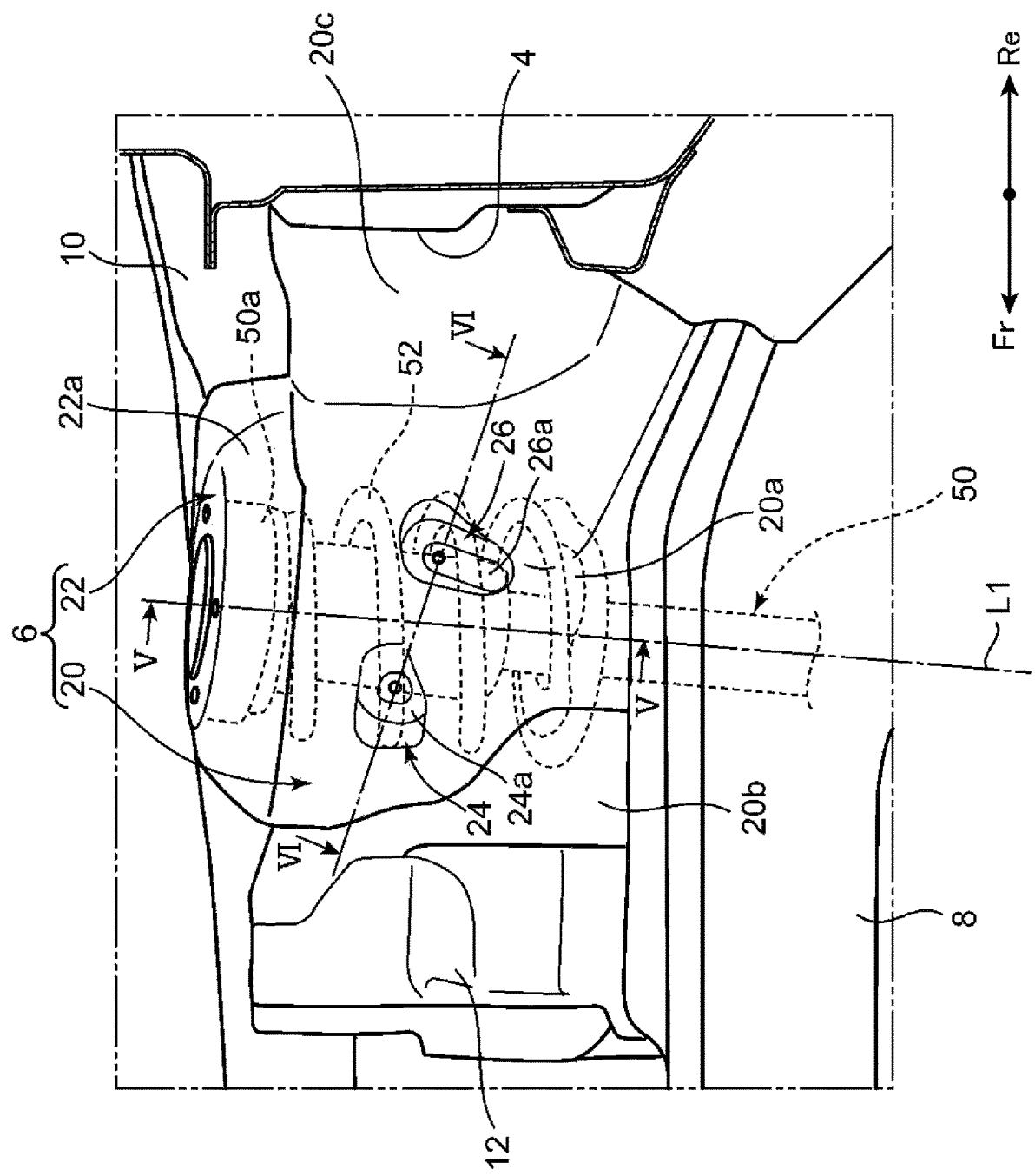
FIG. 4 is a view of the suspension tower in the engine room as seen from the left side (a state in which the bracket is removed).

FIG. 2 is a perspective view of the inside of the engine room 1 in a state in which the wire harness 16 is removed, and FIG. 3 and FIG. 4 are views of the sus-tower 6 in the engine room 1 as seen from the left side. Note that FIG. 3 shows a state in which the bracket 14 is secured, and FIG. 4 shows a state in which the bracket 14 is removed.

The sus-tower 6 is formed so as to jut out from the apron reinforcement 10 toward the vehicle-width-direction inner side (into the engine room 1). The sus-tower 6 includes a curved side wall portion 20, and a top portion 22. Each of the side wall portion 20 and the top portion 22 is a pressed component made from a steel plate, and the sus-tower 6 is formed by joining and integrating these portions by welding.

The side wall portion 20 is formed by integrating a partly cylindrical curved portion 20a, which is curved to have an axis with the upper side inclining slightly toward the rear side with respect to the vertical direction, a front-side flange portion 20b expanding frontward from the front end of the curved portion 20a and extending upward as the front-side flange portion 20b goes to the right side, and a rear-side flange portion 20c expanding rearward from the rear end of the curved portion 20a. "Partly cylindrical" means a shape in which the cross sectional shape is curved to form a part of a cylinder. In the side wall portion 20, the front-side flange portion 20b is joined to the rear end side portion of the connection frame 12. Moreover, the upper half portion of the rear-side flange portion 20c is joined to a side wall portion of the apron reinforcement 10, and the lower half portion is joined to an upper portion of a wheel housing which is not shown in the illustration.

The top portion 22 is arranged to close the upper end of the curved portion 20a formed in a partly cylindrical shape. The top portion 22 includes a damper base portion 22a in the shape of a doom with a substantially flat upper end, and a flange portion 22b expanding rightward from the right end of the damper base portion 22a, and extending in the front-rear direction. In the top portion 22, a peripheral edge (foot portion) of the damper base portion 22a is disposed inside the side wall portion 20, and is integrally joined to the side wall portion 20. Further, the flange portion 22b is joined to the apron reinforcement 10.

Figure 5:
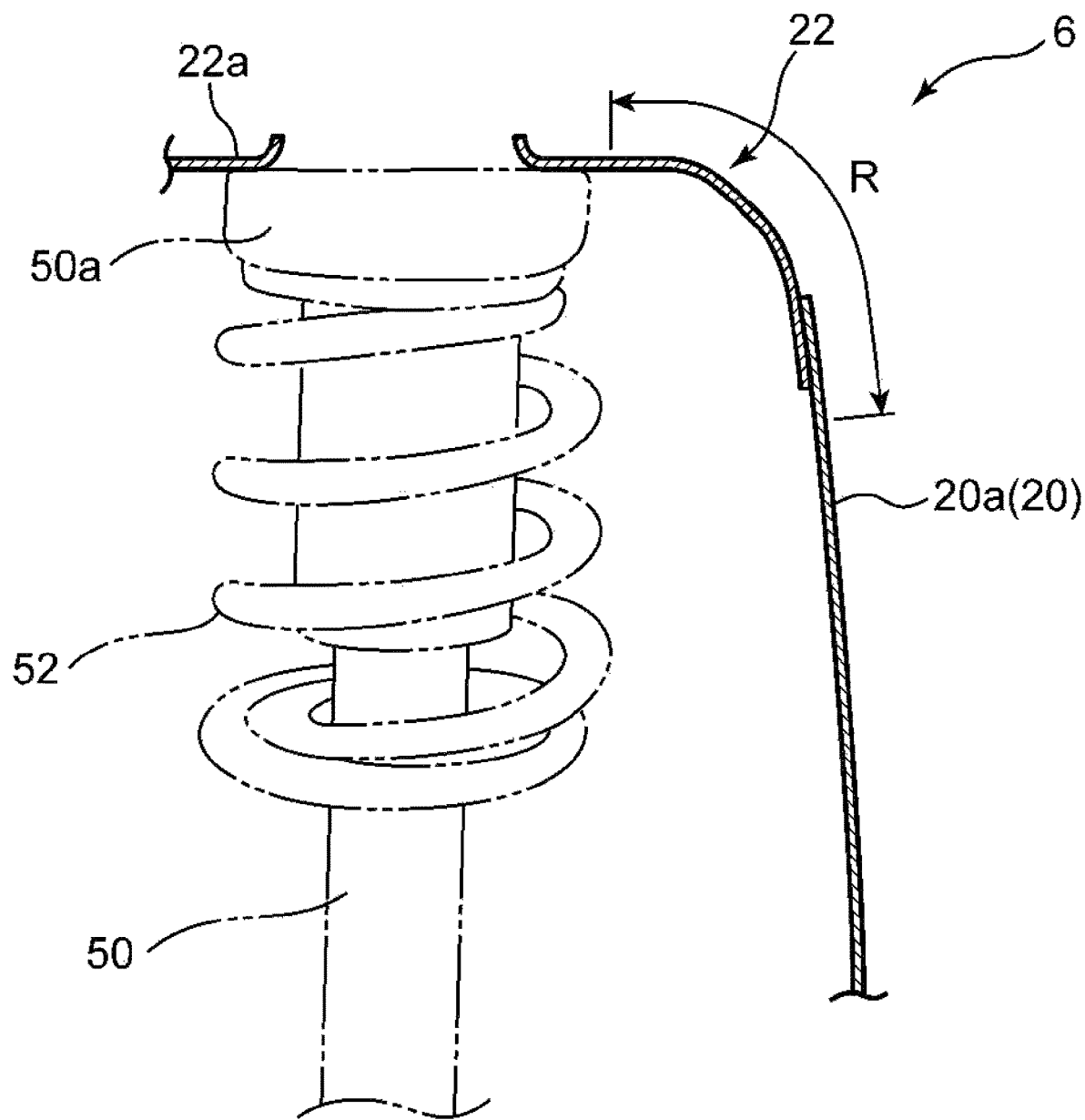
FIG. 5 is a sectional view of the suspension tower (the V-V line sectional view of FIG. 4).
Figure 6:
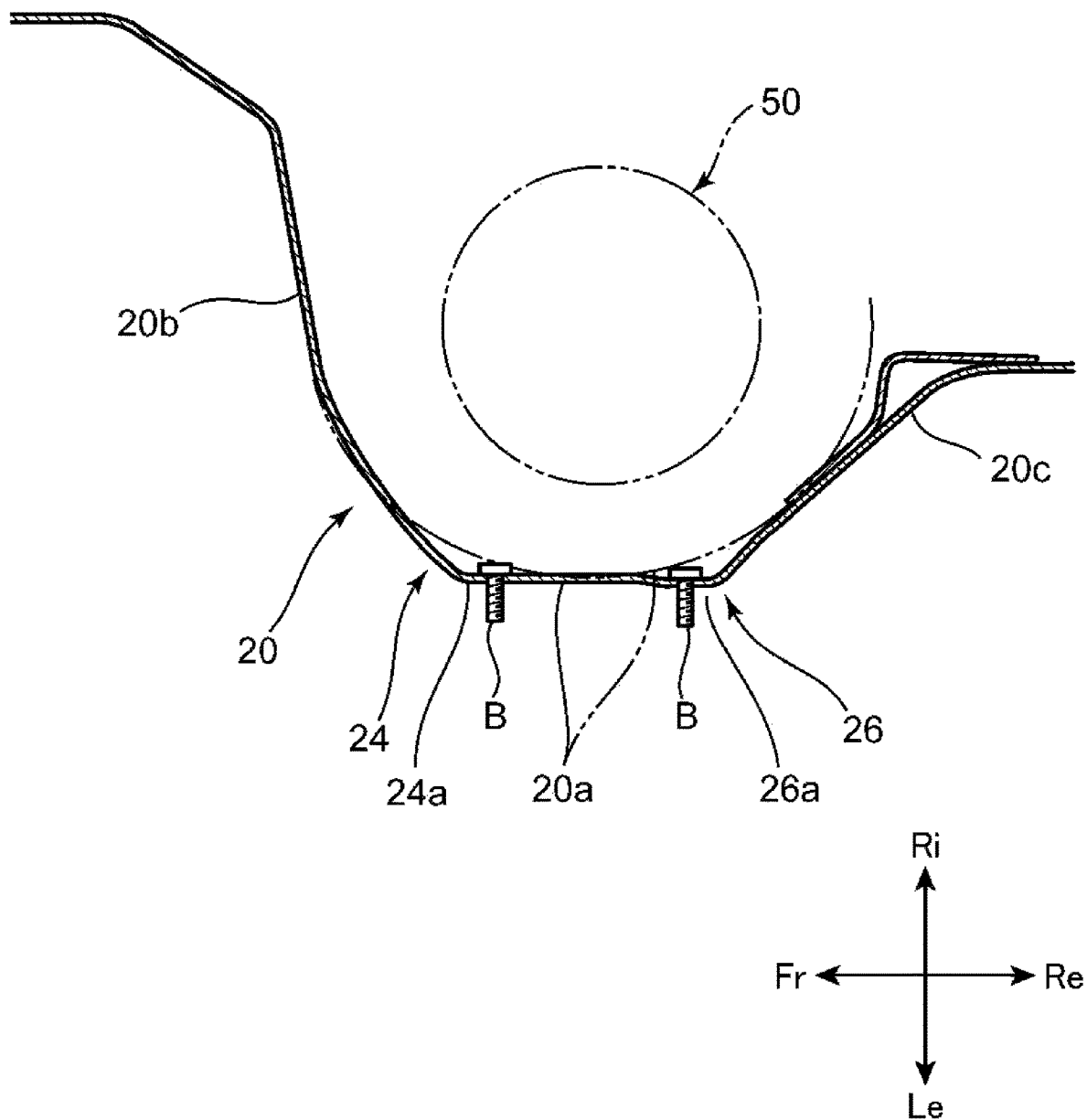
FIG. 6 is a sectional view of the suspension tower (the VI-VI line sectional view of FIG. 4).

FIG. 5 and FIG. 6 are sectional views of the sus-tower 6, FIG. 5 is a sectional view along the V-V line of FIG. 4, and FIG. 6 is a sectional view along the VI-VI line of FIG. 4.

As indicated with the virtual lines in FIG. 4 to FIG. 6, a damper 50 (shock absorber) and a coil spring 52 are disposed inside the sus-tower 6. The damper 50 and the coil spring 52 constitute a front suspension apparatus together with a lower arm which is not shown in the illustration, and have functions of absorbing impact caused by unevenness of a road surface, and reducing vibration of the vehicle body when the vehicle is traveling. The front suspension apparatus mounted on the vehicle in this example is, for example, a strut suspension apparatus in which the damper 50 and the coil spring 52 are integrated.

A spring seat 50a for supporting the coil spring 52 is coupled to the upper end portion of the damper 50. The spring seat 50a is abutted against the top portion 22 of the sus-tower 6 (damper base portion 22a) through a mount rubber from the lower side, and fastened to the damper base portion 22a with a bolt and a nut. Thus, the damper 50 is attached to the sus-tower 6 (damper base portion 22a). In other words, the damper 50 is supported by the sus-tower 6.

The damper 50 supported by the sus-tower 6 is inclined such that the upper side is slightly inclined rearward with respect to the vertical direction. The line L1 indicated by the alternate long and short dash line in FIG. 3 and FIG. 4 represents a virtual line formed by intersecting the sus-tower 6 and a plane that extends parallel to the vehicle width direction and passes through the central axis of the damper 50. Therefore, this line L1 is considered to be the same as the central axis of the damper 50 in FIG. 3 and FIG. 4.

As shown in FIG. 2 to FIG. 4, in the curved portion 20a of the side wall portion 20 of the sus-tower 6, a pair of front and rear mounting portions 24, 26 for mounting a bracket are formed, and the bracket 14 is secured to these mounting portions 24, 26.

Each of the mounting portions 24, 26 is made of a bulge portion formed on the curved portion 20a, and the mounting portion 24 on the front side (referred to as the front-side mounting portion 24 as appropriate) and the mounting portion 26 on the rear side (referred to as the rear-side mounting portion 26 as appropriate) are arranged on mutually different sides with the line L1 interposed therebetween. Moreover, the rear-side mounting portion 26 is offset slightly downward relative to the front-side mounting portion 24. Such an arrangement of the mounting portions 24, 26 is effective for ensuring the rigidity of the sus-tower 6 as described later.

As shown in FIG. 4 and FIG. 6, the mounting portions 24, 26 are substantially frustums in shape with flat mounting faces 24a, 26a at the top, and the mounting faces 24a, 26a are located on the substantially same plane. On mounting faces 24a, 26a, mounting bolts B made of weld bolts (omitted in FIG. 4) are mounted to project perpendicularly to the mounting faces 24a, 26a.

Figure 7A:
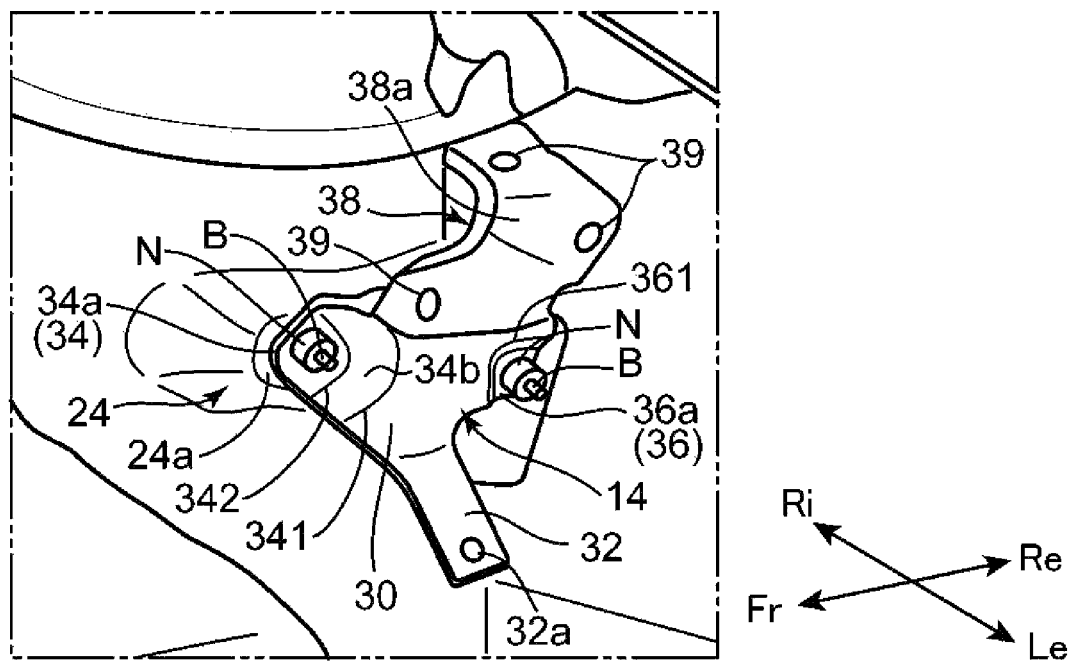
FIGS. 7A to 7C are views showing the bracket.
Figure 7B:
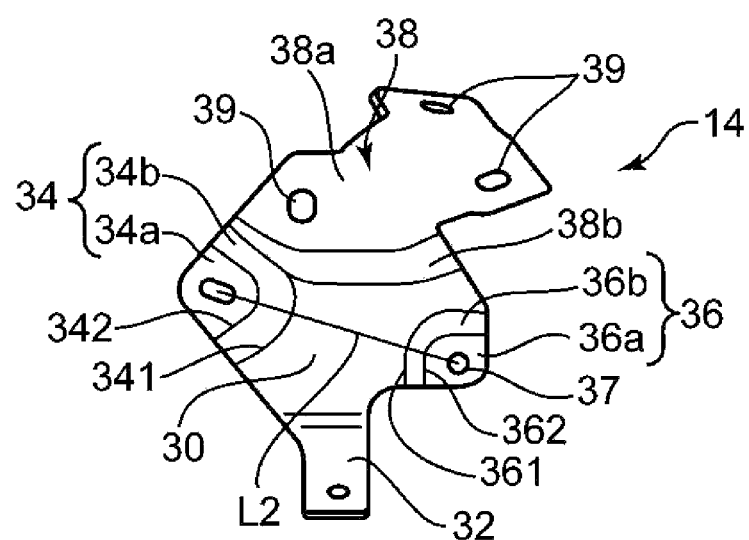
Figure 7C:
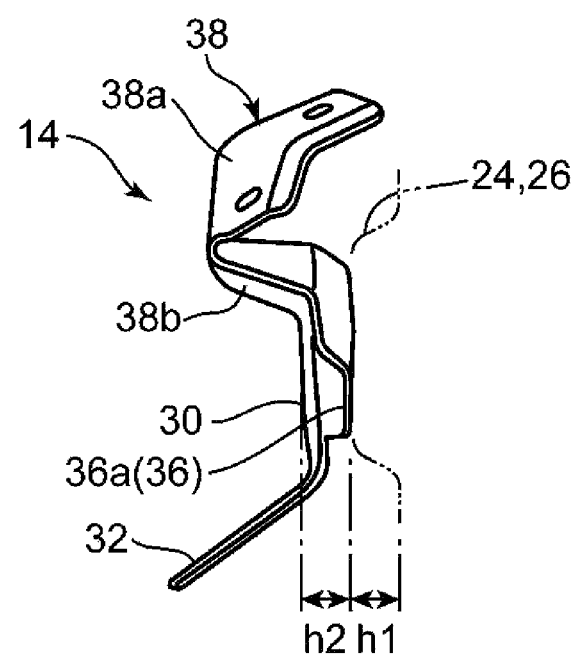

FIGS. 7A-7C show the bracket 14. FIG. 7A is a perspective view (enlarged view of main part of FIG. 2) of the bracket 14 in the state of being secured to the sus-tower 6, FIG. 7B is a front view of the bracket 14, and FIG. 7C is a side view of the bracket 14.

The bracket 14 is a press-formed component made of a metal sheet. The bracket 14 includes a flat base face portion 30 (applicable to a "reference face portion" of the present disclosure), securing portions 34, 36 arranged at front and rear ends of the base face portion 30, a first component attachment portion 32 arranged at a lower end of the base face portion 30, and a second component mounting portion 38 arranged at an upper end of the base face portion 30.

The securing portions 34, 36 are portions of the bracket 14 to be secured to the sus-tower 6 (the curved portion 20a). The securing portion 34 on the front side (referred to as the front-side securing portion 34 as appropriate) is secured to the front-side mounting portion 24 of the sus-tower 6, and the securing portion 36 on the rear side (referred to as the rear-side securing portion 36 as appropriate) is secured to the rear-side mounting portion 26 of the sus-tower 6.

The securing portions 34, 36 are formed, for example, by raising, so as to bulge from the base face portion 30 toward the sus-tower 6 (the side wall portion 20). Consequently, the front-side securing portion 34 has a flat securing face portion 34a offset from the base face portion 30 toward the sus-tower 6, and a connecting face portion 34b connecting the securing face portion 34a and the base face portion 30, and also has a ridge 341 at the boundary between the connecting face portion 34b and the base face portion 30, and a ridge 342 at the boundary between the connecting face portion 34b and the securing face portion 34a. A securing hole 35 corresponding to the mounting bolt B is formed in the securing face portion 34a.

Similarly, the rear-side securing portion 36 has a flat securing face portion 36a offset from the base face portion 30 toward the sus-tower 6, and a connecting face portion 36b connecting the securing face portion 36a and the base face portion 30, and also has a ridge 361 at the boundary between the connecting face portion 36b and the base face portion 30, and a ridge 362 at the boundary between the connecting face portion 36b and the securing face portion 36a. A securing hole 37a is formed in the securing face portion 36a.

The ridges 341, 342, 361, 362 formed in the securing portions 34, 36 are formed so as to intersect the securing positions of the bracket 14 with respect to the mounting portions 24, 26, more specifically, a line segment (straight line L2) connecting the center points of the securing holes 35, 37.

As shown in FIG. 2 and FIG. 3, the bracket 14 is fastened to the sus-tower 6 (the side wall portion 20) by placing the securing portions 34, 36 over the mounting portions 24, 26 while passing the mounting bolts B through the securing holes 35, 37, and screwing nuts N on the mounting bolts B. Consequently, the bracket 14 is secured to the sus-tower 6 in a state in which the bracket 14 straddles both the mounting portions 24, 26.

The first component attachment portion 32 is provided between the securing portions 34 and 36 in the front-rear direction. The first component attachment portion 32 is formed in a thin rectangular shape extending from the base face portion 30 toward the opposite side to the sus-tower 6, and a mounting hole 32a for the wire harness 16 is formed in the vicinity of the distal end thereof.

The second component mounting portion 38 has a mounting face portion 38a offset from the base face portion 30 toward the opposite side to the sus-tower 6, and a connecting face portion 38b connecting the mounting face portion 38a and the base face portion 30. The mounting face portion 38a extends rearward and rightward while being bent. Mounting holes 39 for the wire harness 16 are formed near the front end, near the center, and near the rear end (near the right end), respectively, of the mounting face portion 38a.

As shown in FIG. 1, the wire harness 16 is secured to the first component attachment portion 32 by securing a wiring securing part 16a installed at some middle portion of the wire harness 16 to the first component attachment portion 32 with a bolt and a nut using the mounting hole 32a. Moreover, the wire harness 16 is secured to the second component mounting portion 38 by holding a part of the wire harness 16 with a clip attached to the mounting holes 39 of the second component mounting section 38. Consequently, the wire harness 16 is supported by the sus-tower 6 through the bracket 14.

Working Effects

In the vehicle, the mounting portions 24, 26 made of bulge portions are formed in the side wall portion 20 of the sus-tower 6, and the harness 16 is supported by the sus-tower 6 through the bracket 14 secured to these mounting portions 24, 26. In such a sus-tower structure, unless some countermeasure is taken, when a load is input to the sus-tower from the damper, stress might concentrate at the mounting portions and decrease the rigidity of the sus-tower.

Considering this aspect, in the sus-tower structure of the embodiment, the mounting portions 24, 26 are arranged on mutually different front and rear sides with the line L1 interposed therebetween as described above (FIG. 3 and FIG. 4). The line L1 is a line (virtual line) formed by intersecting the sus-tower 6 and a plane that extends parallel to the vehicle width direction and passes through the central axis of the damper 50 as described above. The load input to the sus-tower 6 from the damper 50 acts mainly on the region along the line L1 in the side wall portion 20. Therefore, with the sus-tower structure of the embodiment in which the mounting portions 24, 26 are allocated to both the front and rear sides of the line L1, concentration of stress at the mounting portions 24, 26 is avoided, and a decrease in the rigidity of the sus-tower 6 due to the concentration of stress is prevented. Moreover, since the bracket 14 straddles both the mounting portions 24, 26 and are secured, the bracket 14 itself functions as a reinforcement member for the sus-tower 6, thereby preventing relative displacement of the regions on both sides of the line L1 in the side wall portion 20.

Thus, with the sus-tower structure of the embodiment, it is possible to reasonably ensure the rigidity of the sus-tower 6 without additionally providing an exclusive reinforcement member in the structure for supporting the wire harness 16 by the sus-tower 6 through the bracket 14.

Figure 8:
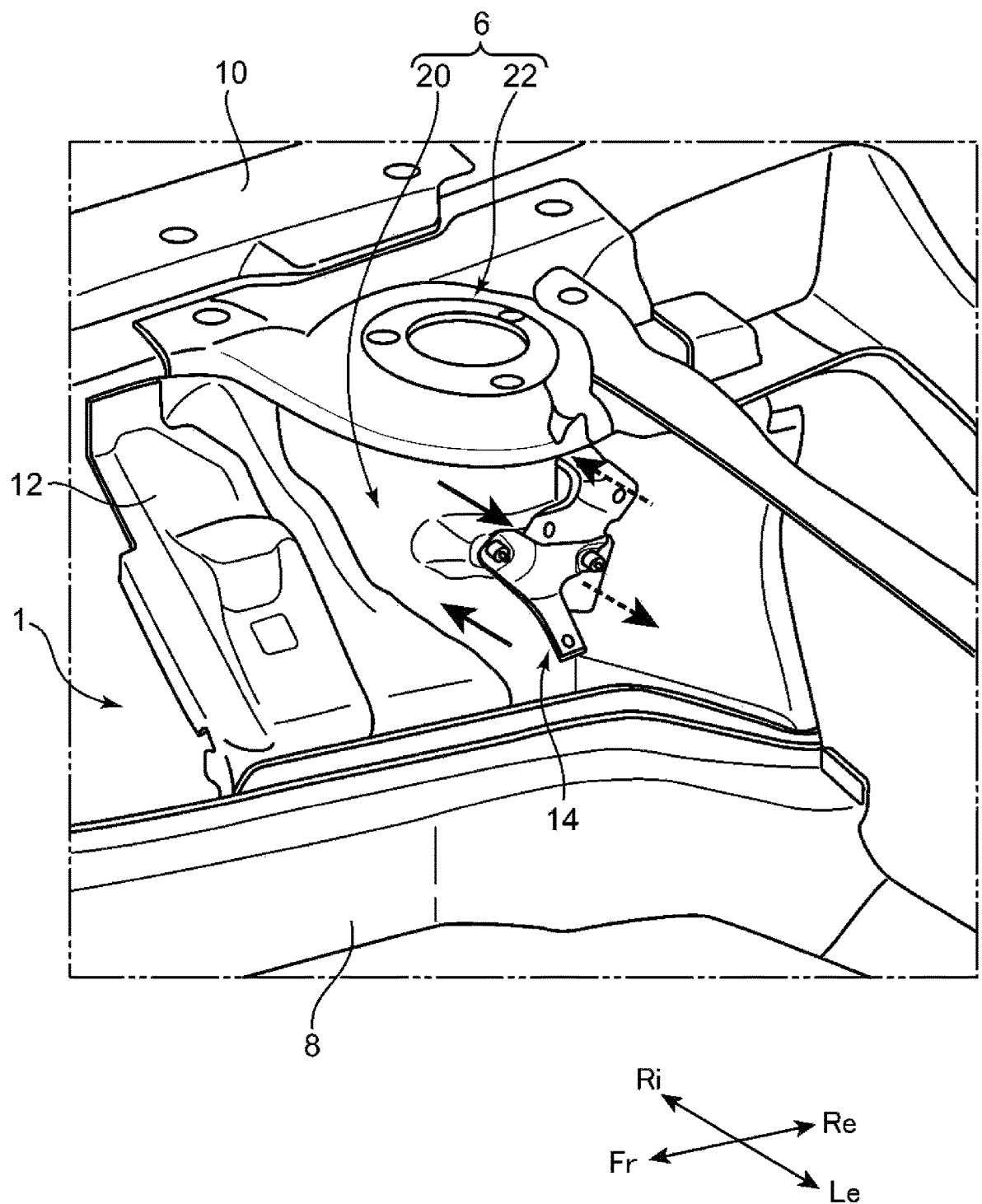
FIG. 8 is a view corresponding to FIG. 2 for explaining deformation of the suspension tower.

Further, in the sus-tower structure of the embodiment, since the mounting portions 24, 26 are offset in the up-down direction, the regions on both the front and rear sides with the line L1 interposed therebetween in the side wall portion 20 are prevented from being deformed as if twisted to each other. That is, for example, as indicated with arrows in FIG. 8, in the region on the front side of the line L1, the side wall portion 20 is prevented from being displaced in such a manner that the upper part is moved leftward and the lower part is moved rightward (as indicated with the solid-line arrows), whereas, in the region on the rear side of the line L1, the side wall portion 20 is prevented from being displaced in such a manner that the upper part is moved rightward and the lower part is moved leftward (as indicated with the broken-line arrows). Consequently, in this aspect, the rigidity of the sus-tower 6 is also ensured with the sus-tower structure of the above-described embodiment.

Furthermore, although not mentioned in the above descriptions, as shown in FIG. 5, a region (the region indicated by reference sign R) from the upper part of the side wall portion 20 to the top portion 22 of the sus-tower 6 is curved in shape at least in a cross section along the line L1. According to such a structure, since a ridge portion is not formed in the portion from the upper part of the side wall portion 20 to the top portion 22, concentration of stress on this portion is less likely to occur, thereby preventing deformation of the sus-tower 6 due to the concentration of stress. Consequently, in this aspect, the rigidity of the sus-tower 6 is also ensured with the sus-tower structure of the above-described embodiment.

Additionally, according to the bracket 14 of the above-described embodiment, since the securing face portions 34a, 46a secured to the sus-tower 6 are offset toward the sus-tower 6 side relative to the base face portion 30, it is possible to reduce a bulging amount h1 (see FIG. 7C) of the mounting portions 24, 26 on the sus-tower 6 (the side wall portion 20) side by a corresponding amount. That is, in a case in which the wire harness 16 and the sus-tower 6 need to be separated from each other by a certain distance, it is possible to reduce the bulging amount h1 on the mounting portions 24, 26 side by only an offset amount h2 of the securing face portions 34a, 36a. Therefore, it is possible to reduce deformation of the mounting portions 24, 26 due to concentration of stress compared to a case in which the bulging amount h1 of the mounting portion 24 is large. Consequently, in this aspect, it is said that the rigidity of the sus-tower 6 is also ensured with the sus-tower structure of the above-described embodiment.

Moreover, the bracket 14 has the ridges 341, 342, 361, 362 formed so as to intersect the line L2 that connects the securing positions for the mounting portions 24, 26 (the center points of the securing holes 35, 37) (FIG. 7B). These ridges 341, 342, 361, 362 prevent twisting deformation of the side wall portion 20 (see the arrows in FIG. 2), that is, deformation as if the regions on both the front and rear sides with the line L1 interposed therebetween are twisted to each other as described above. Consequently, this aspect also contributes to ensuring the rigidity of the sus-tower 6 with the sus-tower structure of the embodiment.

Further, in the bracket 14, the first component attachment portion 32 is located between the securing portions 34 and 36 in the vehicle front-rear direction. According to the structure in which the bracket 14 has the first component attachment portion 32 between the securing portions 34 and 36 which are secured to the sus-tower 6 (the side wall portion 20), the position of the first component attachment portion 32 is less likely to be displaced, thereby providing an advantage of improving the positional stability of the wire harness 16 supported by the first component attachment portion 32.

Modifications

The vehicle sus-tower structure described above is an example of a preferred embodiment of the suspension tower structure according to the present disclosure, and more specific structures of the suspension tower 6 and the bracket 14 to be secured to the suspension tower 6 can be suitably modified within a scope without departing from the gist of the present disclosure.

For example, in the embodiment, a pair of mounting portions 24, 26 of the sus-tower 6 (the side wall portion 20) are located on mutually different sides in the vehicle front-rear direction with the line L1 interposed therebetween. However, as long as at least the mounting faces 24a, 26a of the mounting portions 24, 26 are located on mutually different sides in the vehicle front-rear direction with the line L1 interposed therebetween, it is not required that the whole mounting portions 24, 26 are located completely on mutually different sides with the line L1 interposed therebetween in the vehicle front-rear direction. In other words, the mounting portions 24, 26 are required not to be present on the line L1, or, if present, are to be portions with a small bulging amount. According to this structure, it is possible to reduce or avoid concentration of stress on the mounting portions 24, 26, and it is possible to prevent a decrease in the rigidity of the sus-tower 6 due to the mounting portions 24, 26.

Furthermore, in the embodiment, although the bracket 14 is secured to a pair of the mounting portions 24, 26 formed on the sus-tower 6 (the side wall portion 20), the bracket 14 may be secured to three or more mounting portions. In this case, a pair of the mounting portions are located on mutually different sides in the vehicle front-rear direction with the line L1 interposed therebetween, and the remaining mounting portion is arranged such that at least the mounting face thereof is not positioned on the line L1.

What is claimed is:

1. A vehicle suspension tower structure comprising:
   a suspension tower formed at a side portion in a front compartment of a vehicle body to support a damper; and
   a bracket for mounting a component to be secured to the suspension tower, wherein
   the suspension tower includes a curved side wall portion joined to a front side frame of the vehicle body and extending upward, and a top portion disposed on an upper end of the side wall portion and supporting an upper end of the damper,
   the side wall portion has a pair of mounting portions for the bracket, the mounting portions being made of portions bulging toward a vehicle-width-direction inner side,
   the pair of mounting portions have mounting faces for the bracket, and at least the mounting faces are located on mutually different sides in a vehicle front-rear direction with a line interposed therebetween, the line being formed by intersecting the side wall portion and a plane that extends parallel to a vehicle width direction and contains a central axis of the damper,
   the bracket is disposed to straddle the line and is secured to the pair of mounting portions, and
   the pair of mounting portions are offset in an up-down direction.

2. The vehicle suspension tower structure according to claim 1, wherein the suspension tower is formed such that at least a cross section along the line and extending from an upper part of the side wall portion to the top portion is curved in shape.

3. The vehicle suspension tower structure according to claim 2, wherein the bracket has a ridge extending so as to intersect a line segment connecting securing positions which are secured to the pair of mounting portions.

4. The vehicle suspension tower structure according to claim 3, wherein
   the bracket includes a reference face portion along the side wall portion, a pair of securing portions bulging from the reference face portion toward the suspension tower side, and a component attachment portion extending from the reference face portion toward an opposite side to the suspension tower, and
   each of the securing portions includes a securing face portion that is an inner bottom face portion and is secured to the mounting portion, and a connecting face portion connecting the reference face portion and the securing face portion, and has the ridge at each of boundary portions between the reference face portion and the connecting face portion, and between the securing face portion and the connecting face portion.

5. The vehicle suspension tower structure according to claim 4, wherein the component attachment portion is located between the pair of securing portions in the vehicle front-rear direction.

6. The vehicle suspension tower structure according to claim 1, wherein the bracket has a ridge extending so as to intersect a line segment connecting securing positions which are secured to the pair of mounting portions.

7. The vehicle suspension tower structure according to claim 6, wherein
   the bracket includes a reference face portion along the side wall portion, a pair of securing portions bulging from the reference face portion toward the suspension tower side, and a component attachment portion extending from the reference face portion toward an opposite side to the suspension tower, and
   each of the securing portions includes a securing face portion that is an inner bottom face portion and is secured to the mounting portion, and a connecting face portion connecting the reference face portion and the securing face portion, and has the ridge at each of boundary portions between the reference face portion and the connecting face portion, and between the securing face portion and the connecting face portion.

8. The vehicle suspension tower structure according to claim 7, wherein the component attachment portion is located between the pair of securing portions in the vehicle front-rear direction.

9. A vehicle suspension tower structure comprising:
   a suspension tower formed at a side portion in a front compartment of a vehicle body to support a damper; and
   a bracket for mounting a component to be secured to the suspension tower, wherein
   the suspension tower includes a curved side wall portion joined to a front side frame of the vehicle body and extending upward, and a top portion disposed on an upper end of the side wall portion and supporting an upper end of the damper,
   the side wall portion has a pair of mounting portions for the bracket, the mounting portions being made of portions bulging toward a vehicle-width-direction inner side,
   the pair of mounting portions have mounting faces for the bracket, and at least the mounting faces are located on mutually different sides in a vehicle front-rear direction with a line interposed therebetween, the line being formed by intersecting the side wall portion and a plane that extends parallel to a vehicle width direction and contains a central axis of the damper,
   the bracket is disposed to straddle the line and is secured to the pair of mounting portions, and the suspension tower is formed such that at least a cross section along the line and extending from an upper part of the side wall portion to the top portion is curved in shape.

10. The vehicle suspension tower structure according to claim 9, wherein the bracket has a ridge extending so as to intersect a line segment connecting securing positions which are secured to the pair of mounting portions.

11. The vehicle suspension tower structure according to claim 10, wherein
the bracket includes a reference face portion along the side wall portion, a pair of securing portions bulging from the reference face portion toward the suspension tower side, and a component attachment portion extending from the reference face portion toward an opposite side to the suspension tower, and
each of the securing portions includes a securing face portion that is an inner bottom face portion and is secured to the mounting portion, and a connecting face portion connecting the reference face portion and the securing face portion, and has the ridge at each of boundary portions between the reference face portion and the connecting face portion, and between the securing face portion and the connecting face portion.

12. The vehicle suspension tower structure according to claim 11, wherein the component attachment portion is located between the pair of securing portions in the vehicle front-rear direction.

13. A vehicle suspension tower structure comprising:
a suspension tower formed at a side portion in a front compartment of a vehicle body to support a damper; and
a bracket for mounting a component to be secured to the suspension tower, wherein
the suspension tower includes a curved side wall portion joined to a front side frame of the vehicle body and extending upward, and a top portion disposed on an upper end of the side wall portion and supporting an upper end of the damper,
the side wall portion has a pair of mounting portions for the bracket, the mounting portions being made of portions bulging toward a vehicle-width-direction inner side,
the pair of mounting portions have mounting faces for the bracket, and at least the mounting faces are located on mutually different sides in a vehicle front-rear direction with a line interposed therebetween, the line being formed by intersecting the side wall portion and a plane that extends parallel to a vehicle width direction and contains a central axis of the damper,
the bracket is disposed to straddle the line and is secured to the pair of mounting portions, and
the bracket has a ridge extending so as to intersect a line segment connecting securing positions which are secured to the pair of mounting portions.

14. The vehicle suspension tower structure according to claim 13, wherein
the bracket includes a reference face portion along the side wall portion, a pair of securing portions bulging from the reference face portion toward the suspension tower side, and a component attachment portion extending from the reference face portion toward an opposite side to the suspension tower, and
each of the securing portions includes a securing face portion that is an inner bottom face portion and is secured to the mounting portion, and a connecting face portion connecting the reference face portion and the securing face portion, and has the ridge at each of boundary portions between the reference face portion and the connecting face portion, and between the securing face portion and the connecting face portion.

15. The vehicle suspension tower structure according to claim 14, wherein the component attachment portion is located between the pair of securing portions in the vehicle front-rear direction.

* * * * *